US008728561B2

(12) United States Patent
MacQuarrie

(10) Patent No.: US 8,728,561 B2
(45) Date of Patent: May 20, 2014

(54) EDIBLE FILM COMPOSITIONS FOR PROCESSING OF MEAT PRODUCTS

(75) Inventor: Reg MacQuarrie, Toronto (CA)

(73) Assignee: Living Cell Research Inc., Toronto (CA)

(*) Notice: Subject to any disclaimer, the term of this patent is extended or adjusted under 35 U.S.C. 154(b) by 1021 days.

(21) Appl. No.: 11/106,688

(22) Filed: Apr. 15, 2005

(65) Prior Publication Data

US 2005/0238792 A1 Oct. 27, 2005

Related U.S. Application Data

(60) Provisional application No. 60/562,238, filed on Apr. 15, 2004.

(51) Int. Cl.
A23J 1/02 (2006.01)

(52) U.S. Cl.
USPC .......................................................... 426/657

(58) Field of Classification Search
USPC .................................. 424/439; 426/105, 138
See application file for complete search history.

(56) References Cited

U.S. PATENT DOCUMENTS

| 2,971,849 | A | * | 2/1961 | Keil .............................. 426/273 |
| 3,360,383 | A | * | 12/1967 | Rose et al. ..................... 426/135 |
| 3,917,855 | A | * | 11/1975 | Burke ............................. 426/92 |
| 4,655,840 | A | * | 4/1987 | Wittwer et al. ............ 106/135.1 |
| 4,851,394 | A | * | 7/1989 | Kubodera ....................... 514/54 |
| 4,935,243 | A | * | 6/1990 | Borkan et al. ................ 424/441 |
| 5,419,916 | A | | 5/1995 | Yamamoto et al. |
| 5,622,740 | A | * | 4/1997 | Miller ........................... 426/138 |
| 5,928,737 | A | | 7/1999 | Hammer et al. |
| 5,962,053 | A | * | 10/1999 | Merritt, II ..................... 426/138 |
| 6,274,162 | B1 | * | 8/2001 | Steffenino et al. ............ 424/439 |
| 6,730,340 | B1 | | 5/2004 | MacQuarrie et al. |
| 7,678,397 | B2 | | 3/2010 | MacQuarrie |
| 2001/0024678 | A1 | * | 9/2001 | Scott et al. .................... 426/656 |
| 2003/0224090 | A1 | * | 12/2003 | Pearce et al. .................... 426/89 |
| 2003/0232076 | A1 | * | 12/2003 | Makino et al. ................ 424/456 |
| 2004/0051192 | A1 | * | 3/2004 | Suzuki et al. .................. 264/4.3 |

FOREIGN PATENT DOCUMENTS

| DE | 1213211 B | 11/1962 |
| EP | 0273069 A1 | 7/1988 |
| EP | 0328317 A1 | 8/1989 |
| EP | 0400484 A1 | 12/1990 |
| EP | 0460588 A1 | 6/1991 |
| EP | 0547551 A1 | 12/1992 |
| EP | 0709030 A1 | 5/1996 |
| EP | 0795270 A1 | 2/1997 |
| GB | 2000424 A1 | 6/1978 |
| JP | 6055039 | 3/1985 |
| JP | 489841 | 3/1992 |
| WO | 96/14753 A1 | 5/1996 |
| WO | WO00/67582 | * 11/2000 |

OTHER PUBLICATIONS

Bhanumathy et al. Development and characterization of edible films: interaction of different hydrocolloids with type A or B gelatine. CSIRO, Div. of Food Science and Technology, Brisbane, 1995.*
International Search Report of PCT/CA00/00565 dated Sep. 15, 2004 (4 pages).
International Preliminary Examination Report of PCT/CA00/00565 dated Feb. 16, 2001 (4 pages).

* cited by examiner

Primary Examiner — Brian Gulledge
(74) Attorney, Agent, or Firm — Mintz Levin Cohn Ferris Glovsky and Popeo, P.C.; Ingrid A. Beattie; Shovon Ashraf

(57) ABSTRACT

Novel film compositions are described for use in the processing of meat products, particularly as sausage casings and wrappers for hams and other cured meat products. By combining gelatin and other hydrocolloid film forming polymer materials, edible film compositions are achieved by solution casting which exhibit superior and desirable properties for adhering to the meat product and presenting a shining, appealing surface.

2 Claims, No Drawings

EDIBLE FILM COMPOSITIONS FOR PROCESSING OF MEAT PRODUCTS

RELATED APPLICATION

This application replaces and claims priority from Provisional Application No. 60/562,238 filed on Apr. 15, 2004 and entitled "EDIBLE FILM COMPOSITIONS FOR PROCESSING OF MEAT PRODUCTS".

FIELD OF INVENTION

A new film formulation combining gelatin and one or more other hydrocolloids has been made for use in the processing of ham and smoked meat products. The film can be used in tubular form and as a sausage casing.

BACKGROUND OF THE INVENTION

Several different types of film have been developed for use in the production of smoked meats and netted products. Although these films provide superior performance compared to earlier collagen films, they fell short in two respects:
1. The films do not adhere to the meat as well as conventional collagen films; and
2. The films are not as shiny and appealing in appearance as collagen on the finished product.

I have discovered that by including suitable amount of a medium-to-high molecular weight gelatin, films are produced which have significantly improved adhesion to meat products. The finished product also has improved shine and surface appearance.

SUMMARY OF THE INVENTION

With a view to the production of meat packaging films having superior adhesion properties and imparting an attractive shiny appearance to finished meat products encased in the film we have prepared, using conventional techniques for casting film from aqueous solution, edible film compositions in which the film forming material consists essentially of gelatin and one or more suitable film forming hydrocolloid polymers, including carrageenan, with a gelatin content between 30 wt % and 55 wt % of the total weight of film forming material.

Gelatin is included for its ability to improve film adhesion. The greater the gelatin content, the greater the adhesion and the more effective the film composition becomes in binding to meat surfaces. However, if the gelatin content of the gelatin/hydrocolloid mixture is more than about 55%, the film tends to lose both wet and dry strength and exhibits an undesirable tendency to bind to itself.

As the preferred non-gelatin component of the film forming material, carrageenan imparts both wet and dry strength to the film. The greater the content of carrageenan, the greater the wet strength and the smaller the tendency of the film to "block" (adhere to itself). However, too high a content of carrageenan (more than 50 wt % of the total weight of film forming material) tends to dull the appearance of the film on the product and causes a decrease in film adhesion properties.

As with other films which have been developed to replace collagen in the production of smoked meats and netted products, films formulated according to the present invention will generally include some level of a suitable plasticizer. Plasticizer is added to impart the properties of flexibility required for sausage making, etc. Suitable plasticizers include polyols such as glycerin, propylene glycol and sorbitol.

Other hydrocolloid polymers in addition to carrageenan may be added to the film formulations of the invention prior to casting which improve handling and ease of processing of the film. For example, the addition of locust bean gum increases the elasticity of the film so that the film will stretch rather than burst during the stuffing of casings of the films with meat under high pressure.

The water content of the film is important. The water content should not be above about 25% of the total dry weight of the final film, otherwise the film becomes so adhesive that it adheres to itself unduly and there is increased blocking. On the other hand, if the water content of the film is too low, below about 8%, the film is insufficiently elastic and becomes brittle.

DETAILED DESCRIPTION OF PREFERRED EMBODIMENT

The preferred gelatin is high bloom-250+ of either type A (porcine) or B (bovine). Clarified gelatin is advantageous because it does not cause any discolorations in the film and improves the shine of the product. Gelatin is unique in that it binds very well to the meat proteins of a roast. Gelatin also melts at approximately 37° C. and thus the films essentially disintegrate as it binds to the mat.

Hydrocolloid film forming material can then be added to the film. This will consist of carrageenan and other film forming polymers such as galactomanins, starches, modified celluloses, dextrins and protein-based hydrocolloid film formers such as soya protein, whey protein concentrate, egg proteins, glutens.

As noted, plasticization can be provided by the use of glycerin, propylene glycol, or other polyols. The amount of plasticizer is variable and can go as high in some formulations according to the invention as 35%.

Films according to the present invention comprise at least 5% and preferably at least 20% gelatin by weight of the final film composition, the balance comprising the above described hydrocolloid film former polymers, polyol plasticizer and, optionally, modifiers such as colouring agents, antimicrobials, etc.

The film solution is prepared by heating water to approximately 90° C. and then adding in the various film formers under low shear. The film solution is then mixed until completely homogeneous and degassed under vacuum. The solution is then cast on a stainless steel belt or on a carrier web and dried to the required humidity. The film can alternatively be extruded using a single screw or twin screw extruder.

To prevent films from blocking the films are preferably coated with a starch or silicon dioxide dusting or similar product to prevent the film from blocking to itself. The use of an anti-blocking agent is of critical importance where the film is stored by winding up onto reels under high tension.

These films can be coated with colouring agents and modified with other coatings to prevent moisture absorbance or modify moisture absorbance. Films according to the invention may also include added natural or artificial antibacterial agents.

Examples of Casting Solution Compositions for the Production of Edible Film Composition According to the Invention:

| Example 1 | |
| --- | --- |
| Gelatin | 10 parts |
| Carrageenan | 7 parts |

-continued

| | |
|---|---|
| Glycerin | 5 parts |
| Water | 4–5 parts |
| Example 2 | |
| Gelatin | 10 parts |
| Carrageenan | 7 parts |
| Locust bean gum | 2 parts |
| Glycerin | 5 parts |
| Water | 4–5 parts |
| Example 3 | |
| Gelatin | 10 parts |
| Carrageenan | 5 parts |
| Konjac | 3 parts |
| Glycerin | 4 parts |
| Water | 4–5 parts |

Example of Preferred Film Composition According to the Invention:

| Example 4 | |
|---|---|
| Component | % in finished film |
| Water | 16.67 |
| Gelatin | 21.45 |
| Carrageenan | 17.88 |
| Locust Bean Gum | 14.30 |
| Glycerin | 26.82 |
| Sorbitan Monostearate | 2.92 |

In the above formulation, the amount of gelatin can be reduced to 15.40% by weight or increased to 31.30% of the total weight of the film.

While the above formulations illustrate the invention, one of ordinary skill in the art will readily be able to prepare a large number of formulations according to the invention in which the content of gelatin, other hydrocolloid film formers, plasticizer and water are as described herein and defined in the attached claims which define the invention.

I claim:

1. A uniform film for packaging of meat products, wherein the film consists of:

10 parts gelatin, 7 parts carrageenan, 2 parts locust bean gum, 5 parts glycerin, and 4-5 parts water.

2. A uniform film for packaging of meat products, wherein the film consists of:

16.67% water, 21.45% gelatin, 17.88% carrageenan, 14.30% locust bean gum, 26.82% glycerin, and 2.92% sorbitan monostearate.

* * * * *